(12) United States Patent
Cho et al.

(10) Patent No.: US 10,110,309 B2
(45) Date of Patent: Oct. 23, 2018

(54) HOST UNIT AND RADIO UNIT FOR DISTRIBUTED ANTENNA SYSTEM SUPPORTING LARGE DATA TRAFFIC

(71) Applicant: ELECTRONICS AND TELECOMMUNICATIONS RESEARCH INSTITUTE, Daejeon (KR)

(72) Inventors: Seung-Hyun Cho, Sejong-si (KR); Hwan Seok Chung, Daejeon (KR); Minkyu Sung, Seoul (KR); Jong Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/823,823

(22) Filed: Nov. 28, 2017

(65) Prior Publication Data

US 2018/0152244 A1 May 31, 2018

(30) Foreign Application Priority Data

Nov. 29, 2016 (KR) .................. 10-2016-0160854

(51) Int. Cl.
*H03M 1/66* (2006.01)
*H04B 10/2575* (2013.01)
*H04J 14/02* (2006.01)
*H04B 1/38* (2015.01)

(52) U.S. Cl.
CPC ........ *H04B 10/25753* (2013.01); *H04J 14/02* (2013.01); *H04B 1/38* (2013.01); *H04B 2210/006* (2013.01)

(58) Field of Classification Search
CPC .................... H04B 1/38; H04B 2210/006
USPC ........................... 341/155, 144, 137
See application file for complete search history.

(56) References Cited

U.S. PATENT DOCUMENTS

| 9,184,857 | B2* | 11/2015 | Vassiliou | H04B 17/20 |
| 2013/0003792 | A1* | 1/2013 | Hu | H04B 3/542 |
| | | | | 375/219 |
| 2014/0003395 | A1* | 1/2014 | Hsu | H04B 7/0478 |
| | | | | 370/335 |
| 2014/0233954 | A1 | 8/2014 | Lee et al. | |
| 2016/0285553 | A1 | 9/2016 | Cho et al. | |
| 2018/0159238 | A1* | 6/2018 | Wolniansky | H01Q 13/106 |

FOREIGN PATENT DOCUMENTS

| KR | 10-2010-0003446 A | 1/2010 |
| KR | 10-1626864 B1 | 6/2016 |
| KR | 10-1646512 B1 | 8/2016 |
| KR | 10-2016-0116058 A | 10/2016 |
| WO | 2012/024343 A1 | 2/2012 |

* cited by examiner

*Primary Examiner* — Peguy Jean Pierre
(74) *Attorney, Agent, or Firm* — LRK Patent Law Firm

(57) ABSTRACT

A host unit is provided between a remote radio head and a radio unit. The host unit performs a conversion between a digital optical signal used by the remote radio head and an analog optical signal used by the radio unit. A frequency of the analog optical signal converted by the host unit may be an intermediate frequency. The radio unit performs a conversion between an analog optical signal used by the host unit and an analog radio signal used by a user terminal. A frequency of the analog radio signal may be included in a millimeter wave band or radio frequency band.

10 Claims, 6 Drawing Sheets

HOST UNIT AND RADIO UNIT FOR DISTRIBUTED ANTENNA SYSTEM SUPPORTING LARGE DATA TRAFFIC

CROSS-REFERENCE TO RELATED APPLICATION

This application claims the priority benefit of Korean Patent Application No. 10-2016-0160854, filed Nov. 29, 2016 in the Korean Intellectual Property Office, the disclosure of which is incorporated herein by reference for all purposes.

BACKGROUND

1. Field

One or more example embodiments relate to a distributed antenna system for providing a wireless service in a building.

2. Description of Related Art

When a single antenna covers a wide area, a showing area in which communication is impossible may be present in a coverage area of the antenna. The shadowing area refers to a space in which a radio signal transmitted and received between a user terminal and the antenna is blocked with respect to the user terminal that is wirelessly connected to the antenna. An inside of a building, for example, an indoor environment may include a variety of objects that block a radio signal. For example, the radio signal may be blocked by a wall, or the quality of the radio signal may be degraded. Since a human being generally lives indoors, a wireless service needs to be supported based on an indoor shadowing area.

A distributed antenna system (DAS) refers to a system that spatially distributes and thereby provides a radio unit including an antenna to remove indoor shadowing area and to solve traffic capacity problems. Antennas having a relatively small output power may be distributively installed at a plurality of locations indoors, thereby minimizing the indoor shadowing area.

SUMMARY

At least one example embodiment provides a distributed antenna system including a radio unit and a host unit that may support large wireless transmission in an indoor environment.

According to an aspect of at least one example embodiment, there is provided a host unit connected to a remote radio head and a radio unit, the host unit including a digital optical transceiver configured to convert, to a digital electrical signal, a digital optical signal that is received through a downlink from the remote radio head to the host unit; a digital signal processor configured to generate a baseband digital electrical signal by de-framing the converted digital electrical signal; a digital-to-analog converter (DAC) configured to convert the baseband digital electrical signal to an analog electrical signal; an analog front end controller configured to adjust the amplitude of the analog electrical signal based on an optical transmission between the host unit and the radio unit; a combiner configured to couple the amplitude adjusted analog electrical signal with at least one of a frequency synchronization signal, a time division duplexing signal, and a control and monitor signal for the radio unit; and an analog optical transceiver configured to convert the combined analog electrical signal to an analog optical signal to transmit the combined analog electrical signal through a downlink from the host unit to the radio unit.

The downlink from the remote radio head to the host unit may use a digital optical signal.

The host unit may further include a switch configured to classify the baseband digital electrical signal depending on a radio unit to which the baseband digital electrical signal is to be transmitted among a plurality of radio units, in response to the plurality of radio units being connected to the host unit. The digital-to-analog converter may be configured to receive the baseband digital electrical signal that is classified for each radio unit by the switch.

The analog front end controller may include an amplifier or an attenuator configured to adjust the amplitude of the analog electrical signal.

The analog optical transceiver may include a laser diode configured to directly convert the analog electrical signal to the analog optical signal based on an intermediate frequency.

The host unit may be provided indoors.

According to an aspect of at least one example embodiment, there is provided a radio unit wirelessly connected to a user terminal, the radio unit including an analog optical transceiver configured to convert, to an analog electrical signal, an analog optical signal that is received through a downlink from a host unit to the radio unit; a splitter configured to separate at least one of a frequency synchronization signal, a time division duplexing signal, and a control and monitor signal for the radio unit from the analog electrical signal; an analog front end controller configured to adjust the amplitude of the separated analog electrical signal based on wireless transmission between the radio unit and the user terminal; a frequency converter configured to convert the intermediate frequency of the transmitted analog electrical signal to a radio frequency used for the wireless transmission between the radio unit and the user terminal; and an antenna configured to transmit the analog radio signal to the user terminal.

The frequency converter may be configured to convert the intermediate frequency of the analog electrical signal to a radio frequency or millimeter wave frequency.

The radio unit may be provided indoors based on the wireless transmission between the radio unit and the user terminal.

According to an aspect of at least one example embodiment, there is provided a host unit connected to a remote radio head and a radio unit, the host unit including an analog optical transceiver configured to convert, to an analog optical signal, an analog electrical signal that is transmitted through an uplink from the radio unit to the remote radio head; an analog front end controller configured to adjust the amplitude of the converted analog electrical signal based on optical transmission between the host unit and the remote radio head; an analog-to-digital converter configured to convert the amplitude adjusted analog electrical signal to a digital electrical signal; and a digital optical transceiver configured to convert the digital electrical signal to a digital optical signal to transmit the digital electrical signal through an uplink from the host unit to the remote radio head.

According to an aspect of at least one example embodiment, there is provided a radio unit wirelessly connected to a user terminal and connected to a host unit, the radio unit including an antenna configured to convert, to an analog electrical signal, analog radio signal with a radio frequency carrier that is received from the user terminal; a frequency converter configured to convert a radio frequency of the received analog electrical signal to an intermediate frequency used for an analog optical transmission between the radio unit and the host unit; an analog front end controller configured to adjust the amplitude of the converted analog electrical signal based on an optical transmission between the radio unit and the host unit; and an analog optical transceiver configured to convert the adjusted analog electrical signal to an analog optical signal to transmit the amplitude adjusted analog electrical signal through an uplink from the radio unit to the host unit.

According to example embodiments, there are provided a host unit and a radio unit that may support a large wireless transmission in an indoor environment.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
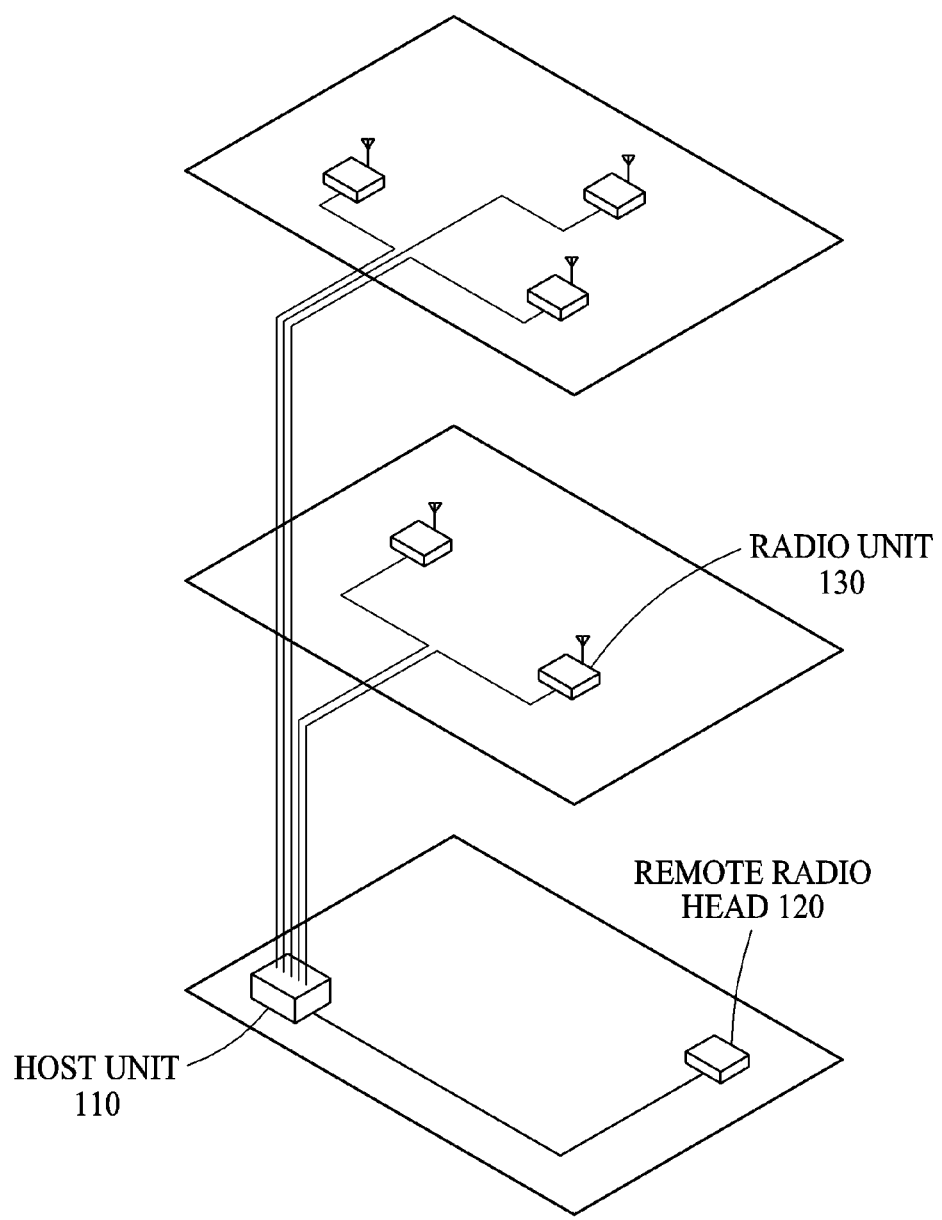
FIG. 1 illustrates a structure of a building to which a distributed antenna system (DAS) is deployed according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings. In the respective drawings, like reference numerals refer to like elements throughout.

FIG. 1 illustrates a structure of a building to which a distributed antenna system (DAS) is deployed according to an example embodiment. The term "building" used herein indicates a construction that is built by a human being and fixed on the ground. Examples of the building may include a manufacturing factory, an office building, a house, and an apartment. A host unit 110 according to an example embodiment may be provided in the building, and may relay a radio signal transmitted to a user present in the building. The host unit 110 may be connected to a remote radio head 120 and a radio unit 130 to relay a radio signal. The remote radio head 120 may be provided outside or inside the building based on a network construction scheme and a network operation scheme of a wireless network provider that provides a wireless service.

The radio unit 130 may be provided indoors and may provide a wireless service to a user terminal indoors. Referring to FIG. 1, the radio unit 130 may include at least one antenna to provide a wireless service to a user terminal indoors. The radio unit 130 may transmit and receive a millimeter wave band radio signal with a wavelength of 1 centimeter (cm) or more and 1 millimeter (mm) or less as a frequency of 10 gigahertz (GHz) or more and 300 GHz or less.

The radio unit 130 may be provided at various locations indoors. The radio unit 130 may be provided for each floor or each room. A location of the radio unit 130 may be determined to minimize a shadowing area indoors. For example, the location of the radio unit 130 may be determined based on how a radio wave propagates in a building.

The host unit 110 and the radio unit 130 may be connected through an optical cable. The host unit 110 and the radio unit 130 may be connected based on a point-to-point configuration or a point-to-multipoint configuration. FIG. 1 illustrates a structure in which the host unit 110 and each of a plurality of radio units 120 are connected based on the point-to-point configuration. It is provided as an example only. The host unit 110 and the plurality of radio units 120 may be connected based on the point-to-multipoint configuration using an optical splitter or a wavelength multiplexer/demultiplexer. If a distance between the host unit 110 and the radio unit 130 is relatively short, the host unit 110 and the radio unit 130 may be connected through a coaxial cable.

The optical cable that connects the host unit 110 and the radio unit 130 may include at least one optical fiber. The optical cable may include a single mode optical fiber or a multi-mode optical fiber. The host unit 110 and the radio unit 130 may transmit and receive an optical signal using an analog optical transceiver. The analog optical transceiver may perform electric-optic conversion or optic-electric conversion of an electrical signal to be transmitted to the user terminal. Further, the analog optical transceiver may minimize a distortion by transmission of the analog optical signal.

Hereinafter, a network and a wavelength band among the remote radio head 120, the host unit 110, the radio unit 130, and the user terminal are further described with reference to FIGS. 2 and 3.

Figure 2:
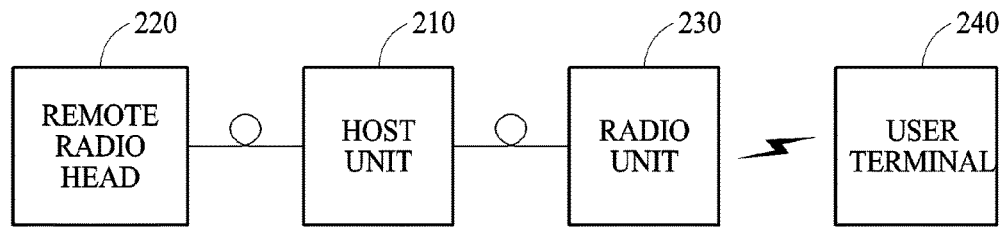
FIG. 2 is a diagram to describe a network connection scheme with a remote radio head, a host unit, a radio unit, and a user terminal according to an example embodiment.

FIG. 2 illustrates a diagram to describe a network among a remote radio head 220, a host unit 210, a radio unit 230, and a user terminal 240 according to an example embodiment.

Referring to FIG. 2, the remote radio head 220 and the host unit 210 may be connected using an optical cable. The remote radio head 220 may be included in a mobile fronthall. The remote radio head 220 may transmit a baseband digital optical signal to the host unit 210. The host unit 210 may also transmit the baseband digital optical signal to the remote radio head 220. The remote radio head 220 and the host unit 210 may be connected through a digital optical link using a digital optical signal. To transmit and receive the digital optical signal, each of the remote radio head 220 and the host unit 210 may include a digital optical transceiver, for example, a small form-factor pluggable (SFP) transceiver, an SFP+ transceiver, an SFP-28 transceiver, and an XFP transceiver.

Referring to FIG. 2, the host unit 210 and the radio unit 230 may be connected using an optical cable. The host unit 210 may relay between the remote radio head 220 and the radio unit 230. The host unit 210 may convert a digital optical signal received from the remote radio head 220 to an analog optical signal.

The host unit 210 and the radio unit 230 may include an analog optical transceiver that supports an analog optical transmission between the host unit 210 and the radio unit 230. The analog optical transceiver may convert an analog electrical signal generated by the host unit 210 to an analog optical signal and may transfer the analog optical signal to the radio unit 230. The analog optical transceiver may generate a multiplexed analog optical signal with multiple baseband radio signals.

An intermediate carrier frequency in the analog optical signal may be determined below frequencies of 10 GHz. As described above, since the intermediate carrier frequency in the analog optical signal is assigned below 10 GHz, the analog optical transceiver may include a directly modulated laser diode. Accordingly, the host unit 210 and the radio unit 230 may be economically implemented based on analog optical transmission.

Referring to FIG. 2, the radio unit 230 and the user terminal 240 may transmit and receive a radio signal. The radio unit 230 may convert an analog optical signal received from the host unit 210 to an analog radio signal with millimeter wave band and may transmit the converted analog radio signal to the user terminal 240. Inversely, the radio unit 230 may convert an analog radio signal with millimeter wave band received from the user terminal 240 to an analog optical signal and may transmit the converted analog optical signal to the host unit 210.

Figure 3:
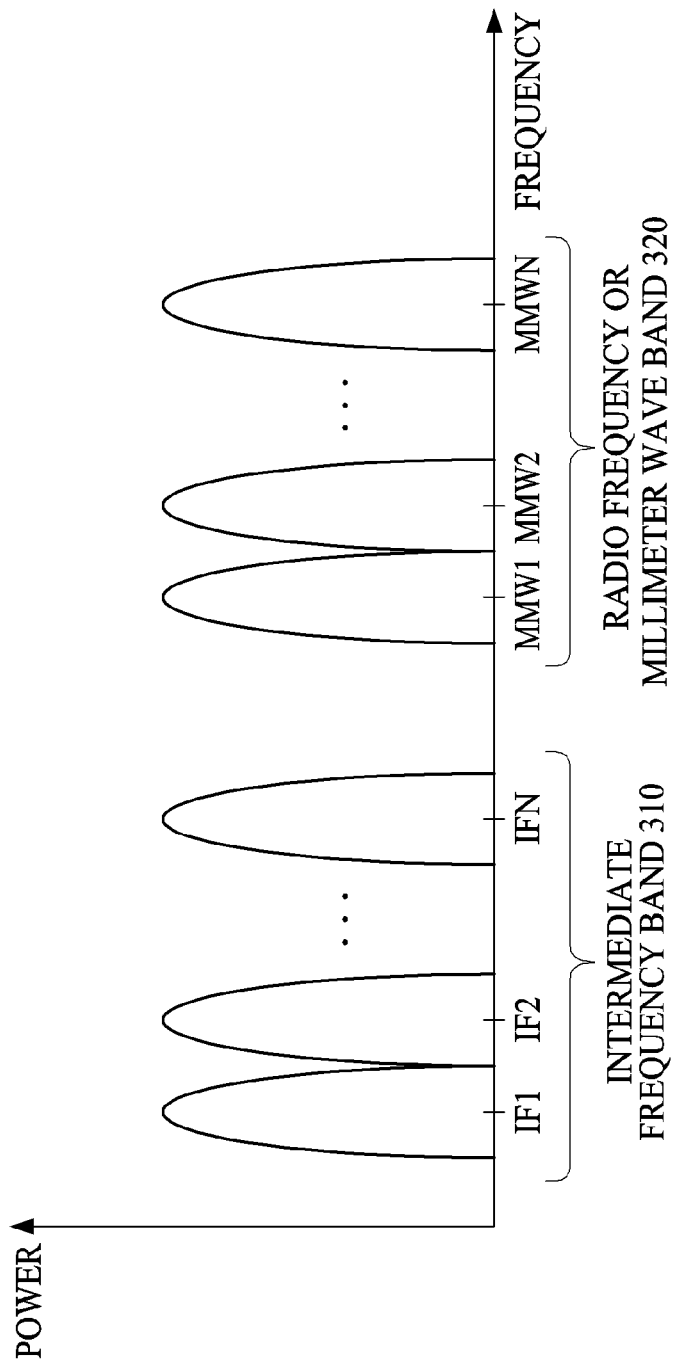
FIG. 3 is a diagram to describe a wavelength band of an analog optical signal used by a host unit and a radio unit and a wavelength band of an analog radio signal used by the radio unit and a user terminal according to an example embodiment.

FIG. 3 is a diagram to describe a frequency plan of an analog optical signal used by a host unit and a radio unit and a frequency plan of an analog radio signal used by the radio unit and a user terminal according to an example embodiment.

Referring to FIG. 3, an optical signal band 310 indicates an intermediate frequency band of an analog optical signal generated by an analog optical transceiver of the radio unit and the host unit. That is, the host unit and the radio unit may transmit and receive the analog optical signal of the frequency band 310. Referring to FIG. 3, the frequency band 310 may include one or more intermediate frequencies, for example, IF1 through IFN. If the intermediate frequency band includes a plurality of baseband signals with intermediate frequencies, a intermediate frequency in the analog optical signal may be selected from among the plurality of intermediate frequencies.

According to an example embodiment, the host unit and the radio unit may transmit and receive an analog optical signal in which a plurality of optical signals having different intermediate frequencies is multiplexed. A frequency assignment (FA) signal indicates an analog optical signal in which a plurality of optical signals is multiplexed. Referring to FIG. 3, the analog optical transceiver may generate the FA signal by multiplexing the frequencies IF1 through IFN.

Referring to FIG. 3, a radio frequency or millimeter wave band 320 indicates a band of an analog radio signal used by the user terminal and the radio unit. The radio frequency or millimeter wave band 320 may include one or more center frequencies in the millimeter wave band or radio frequency band, for example, MMW1 through MMWN. Referring to FIG. 3, a frequency of the radio frequency or millimeter wave band 320 may be greater than that of the intermediate frequency band 310.

According to an example embodiment, the radio unit may convert an analog optical signal with the intermediate frequency band 310 to an analog radio signal with the radio frequency or millimeter wave band 320, that is, may perform frequency up-conversion. The radio unit may transmit the converted analog radio signal to the user terminal.

Also, the radio unit may receive an analog radio signal in the radio frequency or millimeter wave band 320 from the user terminal. The radio unit may generate an analog optical signal with the intermediate frequency band 310 from the received analog radio signal, that is, may perform frequency down-conversion. The radio unit may transmit the generated analog optical signal to the host unit.

Figure 4:
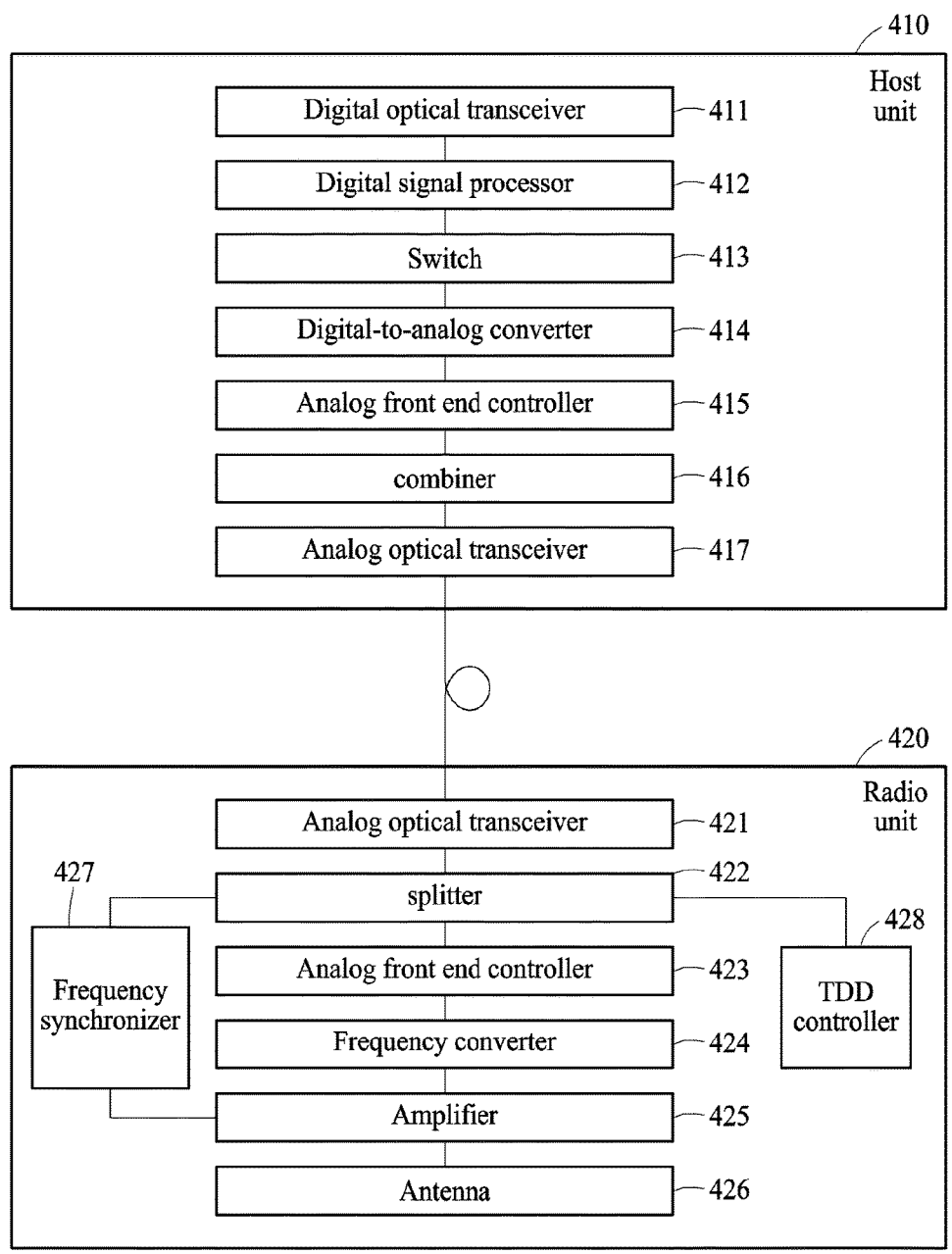
FIG. 4 is a diagram illustrating the configuration of a host unit and a radio unit according to an example embodiment.

FIG. 4 illustrates a configuration of a host unit 410 and a radio unit 420 according to an example embodiment. Hereinafter, the configuration of the host unit 410 and the radio unit 420 based on a downlink from a base station to a user terminal is described A digital optical signal generated by the base station may pass a remote radio head that constitutes a mobile fronthall and be transmitted to the host unit 410. The host unit 410 may be provided indoors, for example, inside a building in which the radio unit 420 is provided. The remote radio head and the host unit 410 may transmit and receive a digital optical signal using a digital optical transceiver 411. The remote radio head and the host unit 410 may be connected through an optical cable capable of transmitting large data.

Referring to FIG. 4, the host unit 410 may include the digital optical transceiver 411 configured to convert a digital optical signal received through the downlink to a digital electrical signal. The digital electrical signal converted by the digital optical transceiver 411 may include a plurality of frames.

The host unit 410 may include a digital signal processor 412 configured to generate a baseband digital electrical signal by de-framing the digital electrical signal converted by the digital optical transceiver 411. Herein, de-framing indicates dividing a frame included in the digital electrical signal into a header portion and a payload portion. For example, the digital signal processor 412 may divide a frame included in a digital electrical signal into a header portion with a length of 2 bytes and a payload portion with a length of 4 bytes. That is, the frame of the digital electrical signal may have a length of 6 bytes. The digital signal processor 412 may perform de-framing with respect to a plurality of frames included in the digital electrical signal. The digital signal processor 412 may perform a variety of digital signal processing. The digital signal processor 412 may generate a baseband digital electrical signal.

When a plurality of radio units 420 are connected to the host unit 410, the host unit 410 may include a switch 413 configured to classify the baseband digital electrical signal based on the specific radio unit 420 to which the baseband electrical signal is to be transmitted among the plurality of radio units 420. The digital electrical signal may include a plurality of pieces of data to be transmitted to different radio units 420. The switch 413 may classify data included in the digital electrical signal based on a radio unit to which each piece of data is to be transmitted. That is, each piece of data included in the digital electrical signal may be provided for each radio unit to which the corresponding data is to be transmitted.

The host unit 410 may include a digital-to-analog converter 414 configured to convert the baseband digital electrical signal to an analog electrical signal. When the plurality of radio units 420 is connected to the host unit 410, the digital-to-analog converter 414 may receive a baseband digital electrical signal classified for each radio unit classified by the switch 413. A frequency of the analog electrical signal generated by the digital-to-analog converter 414 may be the same as a pre-defined intermediate frequency.

The host unit 410 may include an analog front end controller 415 configured to adjust the amplitude of the analog electrical signal. The analog front end controller 415 may shape the analog electrical signal. In detail, the analog front end controller 415 may change the amplitude of a waveform of the analog electrical signal. In particular, the analog front end controller 415 may shape an analog electrical signal based on an analog optical transmission between the host unit 410 and the radio unit 420. Accordingly, the analog electrical signal that passes the analog front end controller 415 may have an amplitude suitable for analog optical transmission. The analog front end controller 415 may include an amplifier or an attenuator configured to adjust the amplitude of the analog electrical signal.

The host unit 410 may include a combiner 416 configured to combine the amplitude adjusted analog electrical signal with at least one of a frequency synchronization signal, a time division duplexing (TDD) signal, and a control and monitor signal for the radio unit 420. The host unit 410 may generate the frequency synchronization signal or the TDD signal used to generate an analog radio signal for radio unit 420. The host unit 410 may control or monitor the radio unit 420 using the control and monitor signal.

The host unit 410 may include an analog optical transceiver 417 configured to convert the analog electrical signal combined by the combiner 416 to an analog optical signal. The host unit 410 may transmit the analog optical signal generated by the analog optical transceiver 417 to the radio unit 420.

The analog optical transceiver 417 may include a directly modulated laser diode configured to directly convert the analog electrical signal to the analog optical signal. Implementation cost of the analog optical transceiver 417 may be reduced by using the directly modulated laser diode.

The analog optical signal generated by the host unit 410 may pass an optical cable and be transmitted to an analog optical transceiver 421 of the radio unit 420. The analog optical transceiver 421 may convert the received analog optical signal to an analog electrical signal.

The radio unit 420 may include a splitter 422 configured to separate at least one of the frequency synchronization signal, the TDD signal, and the control and monitor signal for the radio unit 420 from the analog electrical signal. The splitter 422 may distribute the frequency synchronization signal, the TDD signal, and the control and monitor signal for the respective purposes. The splitter 422 may transmit the frequency synchronization signal separated from the analog electrical signal to a frequency synchronizer 427. The splitter 422 may transmit the TDD signal separated from the analog electrical signal to a TDD controller 428. The splitter 422 may transmit the control signal to a controller of the radio unit 420.

The radio unit 420 may include an analog front end controller 423 configured to adjust the amplitude of the separated analog electrical signal based on a wireless transmission to the user terminal. The analog front end controller 423 may change the amplitude of the analog electrical signal based on a process of converting a frequency of the analog electrical signal from a intermediate frequency to a millimeter wave band or radio frequency band. The analog front end controller 423 may shape the analog electrical signal. That is, the amplitude of the analog electrical signal may be adjusted to be suitable for conversion to the analog radio signal.

The radio unit 420 may include a frequency converter 424 configured to convert a frequency of the amplitude adjusted analog electrical signal to a radio frequency used for wireless transmission between the radio unit 420 and the user terminal. The frequency converter 424 may convert an analog electrical signal having an intermediate frequency to an analog electrical signal having a millimeter wave band frequency or radio frequency band. The frequency converter 424 may convert the frequency of the analog electrical signal depending on the control signal from the frequency synchronizer 427.

As described above, the millimeter wave band frequency is greater than an intermediate frequency. Accordingly, the frequency converter 424 may perform frequency up-conversion of the analog electrical signal. The frequency of the analog electrical signal converted by the frequency converter 424 may be the same as a frequency of an analog radio signal used by the user terminal.

Referring again to FIG. 4, the analog electrical signal converted by the frequency converter 424 may be converted to an analog radio signal by passing an amplifier 425 and an antenna 426. The amplifier 425 may change the amplitude of the analog electrical signal based on an amplitude of the analog radio signal. The antenna 426 may transmit the analog radio signal to the user terminal. The frequency of the analog radio signal may be included in the millimeter wave band or radio frequency band.

The host unit 410 and the radio unit 420 may operate in an uplink from the user terminal to the base station, in a similar manner to the description made regarding the downlink.

The user terminal may transmit the millimeter wave band analog radio signal to the antenna 426. The antenna 426 may collect the received analog radio signal and may transmit the analog radio signal to the amplifier 425. The analog radio signal may pass the amplifier 425 and be transmitted to the frequency converter 424. The frequency converter 424 may change a frequency of the analog radio signal from a millimeter wave band frequency or radio frequency band to an intermediate frequency. The millimeter band wave frequency or radio frequency is greater than the intermediate frequency. Accordingly, the frequency converter 424 may perform frequency down-conversion of the analog electrical signal.

The frequency-down-converted analog electrical signal may be shaped by the analog front end controller 423. That is, the analog front end controller 423 may adjust a waveform of the analog electrical signal based on analog optical transmission to the host unit 410. The analog electrical signal that passes the analog front end controller 423 may be converted to an analog optical signal by the analog optical transceiver 421. When a plurality of user terminals are connected to the radio unit 420, an analog electrical signal of each of the user terminals that passes the analog front end controller 423 may be combined into a single path by the splitter 423. In this case, the analog optical transceiver 421 may convert the combined analog electrical signal to an analog optical signal. The converted analog optical signal may be transmitted to the analog optical transceiver 417 in the host unit 410 through the optical cable.

The analog optical transceiver 417 in the host unit 410 may convert the received analog optical signal to an analog electrical signal. The converted analog electrical signal may be shaped by the analog front end controller 415. The analog front end controller 415 may change a waveform of the analog electrical signal based on digital optical transmission to the remote radio head. The changed analog electrical signal may be converted to a digital electrical signal by the digital-to-analog converter 414. When the plurality of radio units 420 are connected to the host unit 410, the digital electrical signals of the radio units 420 may be combined into a single path by the switch 413.

The digital signal processor 412 may receive the combined digital electrical signal. The digital signal processor 412 may perform digital framing of the digital electrical signal based on optical transmission between the host unit 410 and a baseband unit. That is, the digital signal processor 412 may generate a digital frame by coupling a header portion and a payload portion. The digital optical transceiver 411 may convert the digital electrical signal that passes the digital signal processor 412 to a digital optical signal and may transmit the digital optical signal to the remote radio head.

As described above, the host unit 410 and the radio unit 420 may transmit data without performing digital sampling. Since digital sampling is not performed, an amount of data traffic used to transmit a radio signal may equal to a bandwidth of a baseband signal. Accordingly, a network construction and operation cost may be saved. Further, since the host unit 410 and the radio unit 420 do not perform digital sampling and framing, a delay may be relatively short compared to digital transmission and reception procedure.

Hereinafter, a method of using intermediate frequencies included in a baseband based on a connection between the host unit 410 and the radio unit 420 is described.

Figure 5:
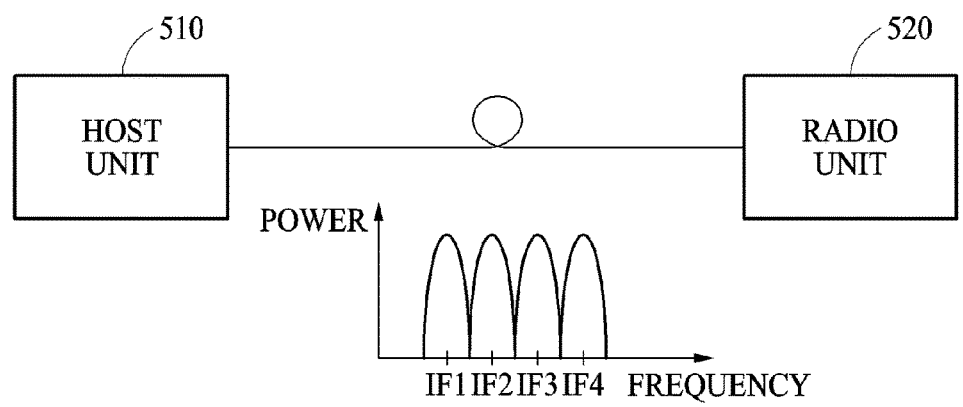
FIG. 5 illustrates the configuration of a network in which a host unit and a radio unit are connected based on a point-to-point configuration according to an example embodiment.

FIG. 5 illustrates a configuration of a network in which a host unit 510 and a radio unit 520 are connected based on a point-to-point configuration according to an example embodiment.

The host unit 510 and the radio unit 520 may use a different wavelength with respect to each of an uplink and a downlink. In a point-to-point configuration, an analog optical signal generated by the host unit 510 may be transmitted to a single radio unit 520. That is, a plurality of user terminals may be connected to the host unit 510 through a single radio unit 520. Analog radio signals generated by the respective user terminals may be combined into a single analog optical signal by the radio unit 520.

The host unit 510 and the radio unit 520 may transmit and receive an analog optical signal using a wavelength division multiplexing (WDM) method. Referring to FIG. 5, a baseband signals may include one or more intermediate frequencies, for example, IF1, IF2, IF3, and IF4. The host unit 510 may transmit, to the radio unit 520, an analog optical signal in which optical signals having different intermediate frequencies are multiplexed. The radio unit 520 may transmit, to the host unit 510, the analog optical signal in which the optical signals having different intermediate frequencies are multiplexed.

Figure 6:
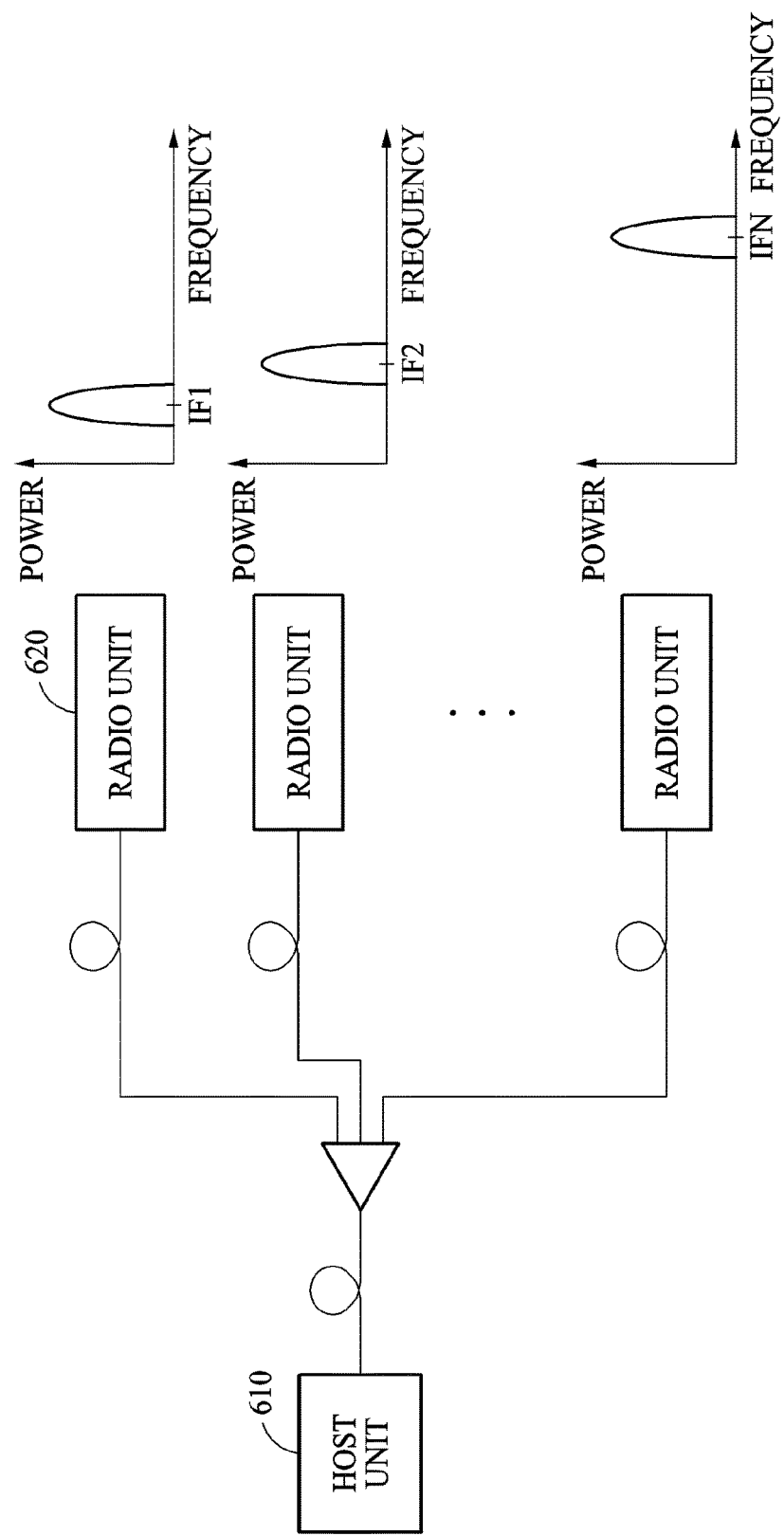
FIG. 6 illustrates the configuration of a network in which a host unit and radio units are connected based on a point-to-multipoint configuration according to an example embodiment.

FIG. 6 illustrates a configuration of a network in which a host unit 610 and a radio unit 620 are connected based on a point-to-multipoint configuration according to an example embodiment. Referring to FIG. 6, a plurality of radio units 620 may be connected to a single host unit 610. In a downlink between the host unit 610 and the radio unit 620, the host unit 610 may transmit an analog optical signal using a WDM method or a frequency division multiplexing (FDM) method. In an uplink between the host unit 610 and the radio unit 620, the radio unit 620 may transmit an analog optical signal using the WDM method to avoid optical beating interference occurring when using a single wavelength.

In the downlink, the analog optical signal generated by the host unit 610 may be separated in the frequency domain and transmitted to a different radio unit 620 based on a predefined frequency plan. Referring to FIG. 6, the plurality of radio units 620 connected to the host unit 610 may use different intermediate frequencies. The analog optical signal generated by the host unit 610 may be separated based on a plurality of intermediate frequencies. Each of the separated analog optical signals may be transmitted to the radio unit 620 that uses a corresponding intermediate frequency.

In the uplink, each of the plurality of radio units 620 may generate an analog optical signal having a different intermediate frequency. That is, a millimeter wave band or radio frequency band analog radio signal generated by the user terminal may be converted to an analog optical signal having an intermediate frequency used by the radio unit 620 connected with the user terminal. The plurality of analog optical signals generated by the plurality of radio units 620 may be multiplexed and transmitted to the host unit 610. The host unit 610 may convert the received analog optical signal to a digital optical signal and may transmit the digital optical signal to a remote radio head.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A host unit connected to a remote radio head and a radio unit, the host unit comprising:
   a digital optical transceiver configured to convert, to a digital electrical signal, a digital optical signal that is received through a downlink from the remote radio head to the host unit;
   a digital signal processor configured to generate a baseband digital electrical signal by de-framing the converted digital electrical signal;
   a digital-to-analog converter configured to convert the baseband digital electrical signal to an analog electrical signal;
   an analog front end controller configured to adjust the amplitude of the analog electrical signal based on an optical transmission between the host unit and the radio unit;
   a combiner configured to couple the amplitude adjusted analog electrical signal with at least one of a frequency synchronization signal, a time division duplexing signal, and a control and monitor signal for the radio unit; and
   an analog optical transceiver configured to convert the combined analog electrical signal to an analog optical signal to transmit the combined analog electrical signal through a downlink from the host unit to the radio unit.

2. The host unit of claim 1, wherein the downlink from the remote radio head to the host unit uses a digital optical signal.

3. The host unit of claim 1, further comprising:
   a switch configured to classify the baseband digital electrical signal depending on a radio unit to which the baseband digital electrical signal is to be transmitted among a plurality of radio units, in response to the plurality of radio units being connected to the host unit, wherein the digital-to-analog converter is configured to receive the baseband digital electrical signal that is classified for each radio unit by the switch.

4. The host unit of claim 1, wherein the analog front end controller comprises an amplifier or an attenuator configured to adjust the amplitude of the analog electrical signal.

5. The host unit of claim 1, wherein the analog optical transceiver comprises a laser diode configured to directly convert the analog electrical signal to the analog optical signal with an intermediate frequency carrier.

6. The host unit of claim 1, wherein the host unit is provided indoors.

7. A radio unit wirelessly connected to a user terminal, the radio unit comprising:
    an analog optical transceiver configured to convert, to an analog electrical signal, an analog optical signal that is received through a downlink from a host unit to the radio unit;
    a splitter configured to separate at least one of a frequency synchronization signal, a time division duplexing signal, and a control and monitor signal for the radio signal from the analog electrical signal;
    an analog front end controller configured to adjust the amplitude of the separated analog electrical signal based on wireless transmission between the radio unit and the user terminal;
    a frequency converter configured to convert a frequency of the adjusted analog electrical signal to a radio frequency used for the wireless transmission between the radio unit and the user terminal; and
    an antenna configured to transmit the analog radio signal to the user terminal.

8. The radio unit of claim 7, wherein the frequency converter is configured to convert a frequency of the analog electrical signal to a millimeter wave band or radio frequency band.

9. The radio unit of claim 7, wherein the radio unit is provided indoors based on the wireless transmission between the radio unit and the user terminal.

10. A host unit connected to a remote radio head and a radio unit, the host unit comprising:
    an analog optical transceiver configured to convert, to an analog electrical signal, an analog optical signal that is transmitted through an uplink from the radio unit to the remote radio head;
    an analog front end controller configured to adjust the amplitude of the converted analog electrical signal based on optical transmission between the host unit and the remote radio head;
    a digital-to-analog converter configured to convert the amplitude adjusted analog electrical signal to a digital electrical signal; and
    a digital optical transceiver configured to convert the digital electrical signal to a digital optical signal to transmit the digital electrical signal through an uplink from the host unit to the remote radio head.

* * * * *